(12) United States Patent
Chang

(10) Patent No.: US 11,275,418 B1
(45) Date of Patent: Mar. 15, 2022

(54) WIRELESS SENSING SYSTEM WITH BACKUP POWER

(71) Applicant: Chaoyang University of Technology, Taichung (TW)

(72) Inventor: Chia-Chi Chang, Taichung (TW)

(73) Assignee: CHAOYANG UNIVERSITY OF TECHNOLOGY, Taichung (TW)

( * ) Notice: Subject to any disclaimer, the term of this patent is extended or adjusted under 35 U.S.C. 154(b) by 0 days.

(21) Appl. No.: 17/471,282

(22) Filed: Sep. 10, 2021

(30) Foreign Application Priority Data

Sep. 11, 2020 (TW) .................................. 109131344

(51) Int. Cl.
*G06F 1/26* (2006.01)
(52) U.S. Cl.
CPC .................................. *G06F 1/263* (2013.01)
(58) Field of Classification Search
CPC ...................................................... G06F 1/263
See application file for complete search history.

(56) References Cited

U.S. PATENT DOCUMENTS

| | | | | |
|---|---|---|---|---|
| 5,502,689 A * | 3/1996 | Peterson | ............... | G06F 1/3203 368/156 |
| 9,191,075 B2 * | 11/2015 | Jung | ....................... | H02J 50/10 |
| 10,712,802 B2 | 7/2020 | Chang | | |
| 2012/0044011 A1 * | 2/2012 | Helle | ....................... | G06F 1/26 327/392 |
| 2018/0307291 A1 * | 10/2018 | Chang | ....................... | G06F 1/10 |

FOREIGN PATENT DOCUMENTS

| | | |
|---|---|---|
| CN | 203561444 U | 4/2014 |
| CN | 205305207 U | 6/2016 |
| CN | 110855013 A | 2/2020 |
| CN | 111593949 A | 8/2020 |
| TW | M546577 U | 8/2017 |

\* cited by examiner

*Primary Examiner* — Zahid Choudhury
(74) *Attorney, Agent, or Firm* — Muncy, Geissler, Olds & Lowe, P.C.

(57) ABSTRACT

A wireless sensing system includes a power supply unit, a control unit, a backup power unit, and a wake-up unit. The control unit includes a microprocessor. The microprocessor acts according to a forced shutdown instruction and transmits the forced shutdown instruction to the wake-up unit through an internal control pin in order for the wake-up unit to generate a forced shutdown clock matching the forced shutdown instruction, transmit the forced shutdown clock to the power supply unit, and thereby stop the power supply unit from generating electricity, and for the backup power unit to transmit the electricity stored therein to the wake-up unit and thereby enable the wake-up unit to maintain its basic electrically driven functions. The backup power unit can supply a small amount of electricity to sustain the basic electrically driven functions of the system.

20 Claims, 2 Drawing Sheets

WIRELESS SENSING SYSTEM WITH BACKUP POWER

BACKGROUND OF THE INVENTION

1. Technical Field

The present invention relates to a wireless sensing system and more particularly to a wireless sensing system with backup power.

2. Description of Related Art

Common zinc-carbon batteries or low self-discharge batteries can retain a certain amount of electricity after being stored for a predetermined period of time and are therefore often used as the main power source of a wireless sensing system that is required to operate for a long time. Generally, a wireless sensing system is brought into a hibernation mode or sleep mode whenever possible in order to effectively reduce the consumption of electricity from the power source of the system and thereby prolong system operation. However, even if the entire system is in the hibernation mode or sleep mode, power consumption continues, which requires the step-up transformer in the system to stay in the working stage and keep consuming electricity from the power source.

The present invention aims to overcome the aforesaid technical drawback in power supply and increase the working time of a wireless sensing system effectively.

BRIEF SUMMARY OF THE INVENTION

One objective of the present invention is to provide a wireless sensing system that has such structural features as a control unit and a backup power unit electrically controlled by the control unit. The wireless sensing system can be distinguished from the prior art by the technical feature that the backup power unit can supply a small amount of electricity to sustain the basic electrically driven functions of the wireless sensing system when the wireless sensing system in a forced shutdown mode. The invention provides a substantial improvement on the incessant consumption of electricity from the power source of a conventional wireless sensing system and thus optimizes power supply to such a system.

To achieve the foregoing objective, the wireless sensing system of the present invention includes a power supply unit, a control unit, a backup power unit, and a wake-up unit.

The power supply unit is electrically connected to the control unit and the backup power unit. The control unit includes a microprocessor, a wireless transmission module, and a memory module. The microprocessor is electrically connected to, and is configured to electrically control, the wireless transmission module and the memory module. The backup power unit is electrically connected to the wake-up unit. The wake-up unit has an internal control pin and an enabling pin. The microprocessor of the control unit is electrically connected to the internal control pin of the wake-up unit, and the wake-up unit is electrically controlled by the microprocessor through the internal control pin. The enabling pin of the wake-up unit is electrically connected to, and is configured to electrically control, the power supply unit. The microprocessor of the control unit reads a forced shutdown instruction from the memory module and transmits the forced shutdown instruction to the wake-up unit through the internal control pin in order for the wake-up unit to generate a forced shutdown clock matching the forced shutdown instruction and transmit the forced shutdown clock to the power supply unit through the enabling pin. The power supply unit will act according to the forced shutdown clock and thereby stop generating electricity. The backup power unit, on the other hand, will transmit backup electricity to the wake-up unit. Then, within a first predetermined sequence cycle, the wake-up unit will generate an internal wake-up clock and transmit the internal wake-up clock to the power supply unit through the enabling pin in order for the power supply unit to generate electricity again according to the internal wake-up clock. The technical feature that the power supply unit of the wireless sensing system acts according to the forced shutdown clock and thereby stops generating electricity and supplying the electricity to the control unit and the backup power unit brings the wireless sensing system into a forced shutdown mode, and the technical feature that the backup power unit supplies electricity to the wake-up unit allows the wireless sensing system to maintain its basic electrically driven functions while in the forced shutdown mode.

Preferably, the wireless sensing system further includes an electrical detection unit with a trigger module and an external trigger sensor, and the wake-up unit further has an external drive pin. The trigger module of the electrical detection unit has an external trigger reporting pin and an external trigger transmission pin. The microprocessor of the control unit is electrically connected to the external trigger reporting pin of the trigger module. The external trigger sensor is electrically connected to the external trigger transmission pin of the trigger module. The output end of the trigger module is electrically connected to the external drive pin of the wake-up unit. The trigger module acts according to an external wake-up instruction and transmits the external wake-up instruction to the wake-up unit through the external drive pin so that, within a second predetermined sequence cycle, the wake-up unit generates an external wake-up clock matching the external wake-up instruction and transmits the external wake-up clock to the power supply unit through the enabling pin in order for the power supply unit to generate electricity again according to the external wake-up clock. The technical feature that the power supply unit of the wireless sensing system acts according to the external wake-up clock and thereby generates again the electricity required for computation by the control unit enables the wireless sensing system to have and carry out an external wake-up mechanism and function by way of the electrical detection unit while in the forced shutdown mode.

The structural details, features, and assembly or use method of the present invention will be described at greater length below. However, as a person of ordinary skill in the art would understand, the following detailed description and the specific embodiments disclosed herein serve only to expound the invention but not to restrict the scope of the patent protection sought by the applicant.

DETAILED DESCRIPTION OF THE INVENTION

Figure 1:
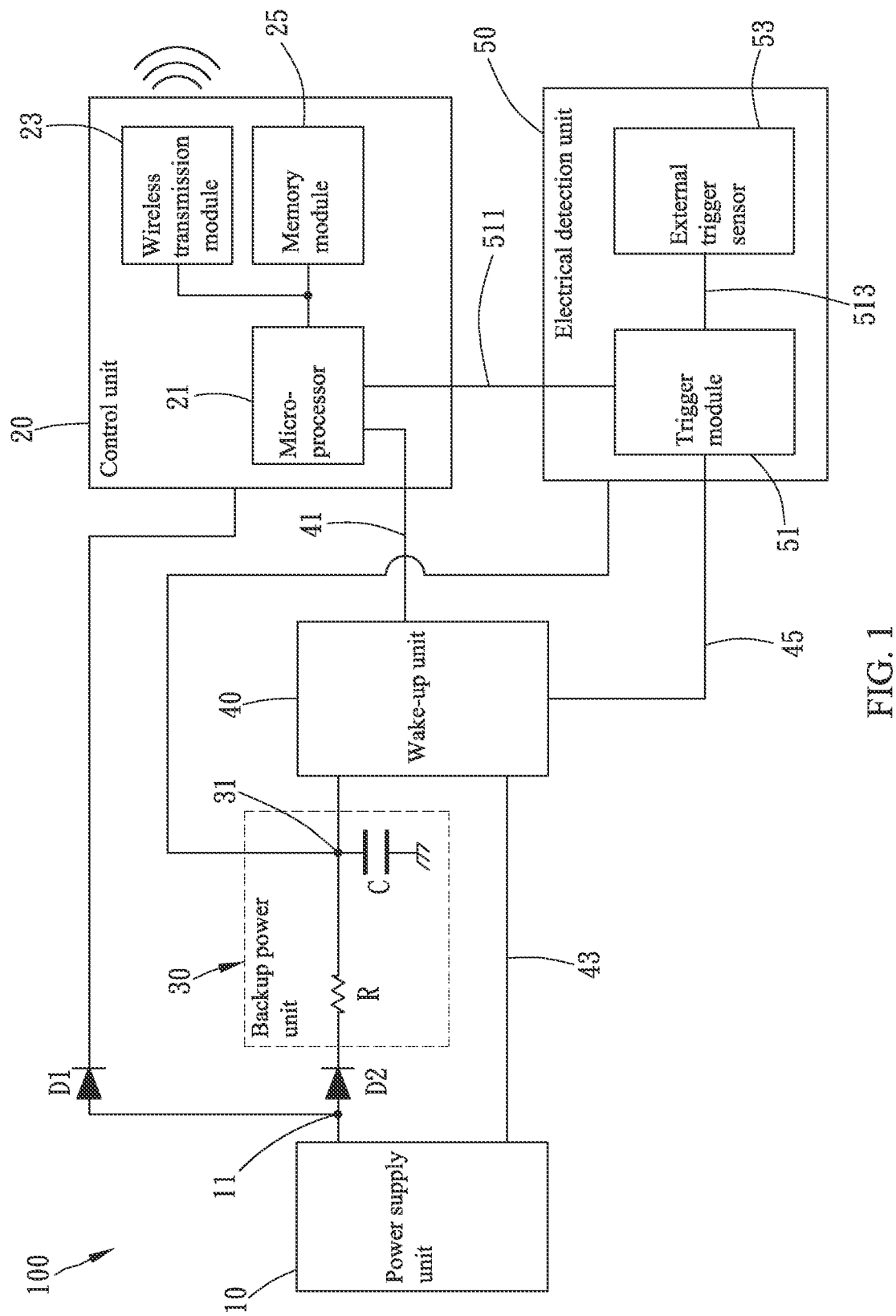
FIG. 1 is a structural diagram of the wireless sensing system according to the first preferred embodiment of the present invention.

To begin with, the applicant wishes to point out that throughout this specification, including the embodiments described below and the appended claims, all the directional terms make reference to the directions in the drawings. Besides, identical or similar elements or structural features in the following embodiments and the drawings are indicated by the same reference numeral.

Referring to FIG. 1, the wireless sensing system 100 according to the first preferred embodiment of the present invention (e.g., a home security monitoring system, an access monitoring system, an intelligent campus monitoring system, or a parking lot monitoring system) includes a power supply unit 10, a control unit 20, a backup power unit 30, a wake-up unit 40, and an electrical detection unit 50.

The power supply unit 10 is electrically connected to the control unit 20 and the backup power unit 30. The power supply unit 10 includes a DC-DC booster module for supplying the electricity required for computation by the control unit 20 and the electricity required for the backup power unit 30. It is worth mentioning that the output end 11 of the DC-DC booster module of the power supply unit 10 is electrically connected in parallel to the positive electrodes of two diodes D1 and D2, that the negative electrode of the diode D1 is electrically connected to the control unit 20, and that the negative electrode of the diode D2 is electrically connected to the backup power unit 30.

The control unit 20 includes a microprocessor 21, a wireless transmission module 23, and a memory module 25. The microprocessor 21 is electrically connected to, and is configured to electrically control, the wireless transmission module 23 and the memory module 25. The microprocessor 21 has a dynamic multi-protocol manager (DMM) procedure for switching the wireless transmission module 23 to a wireless communication protocol matching the currently required one. In other words, the DMM procedure of the microprocessor 21 allows the wireless transmission module 23 to perform data or signal transmission according to such wireless communication protocols as IEEE 802.15.4, Wi-Fi, ZigBee, Bluetooth communication/transmission protocols (including but not limited to Bluetooth h2.x+EDR, Bluetooth h3.0+HS, Bluetooth 4.x, and Bluetooth Low Energy), and NFC (Near Field Communication). The memory module 25 is configured to store the logic program (or its subprogram) of a work instruction or forced shutdown instruction to be carried out by the microprocessor 21.

The backup power unit 30 has an output end 31. The wake-up unit 40 and the electrical detection unit 50 are electrically connected to the output end 31 of the backup power unit 30 separately. The backup power unit 30 includes a pull-up resistor R and a supercapacitor C (also known as a double-layer capacitor or ultracapacitor). The pull-up resistor R has one end electrically connected to the negative electrode of the diode D2 and the other end electrically connected to one end of the supercapacitor C and defined as the output end 31. The other end of the supercapacitor C is electrically connected to the ground.

The wake-up unit 40 has an internal control pin 41, an enabling pin 43, and an external drive pin 45. The internal control pin 41 is electrically connected to and electrically controlled by the control unit 20. The enabling pin 43 is electrically connected to, and is configured to electrically control, the power supply unit 10. The external drive pin 45 is electrically connected to and electrically controlled by the electrical detection unit 50. It is worth mentioning that in this embodiment, the wake-up unit 40 is composed of a low-power-consumption timer (model no.: TPL5110) by way of example. The timer is configured to carry out the following within a predetermined sequence cycle: to generate a working clock matching the instruction or signal of the internal control pin 41 and to transmit the working clock to the power supply unit 10 electrically through the enabling pin 43. The use of this timer, however, is not a technical feature of, or a limitation on, the present invention.

The electrical detection unit 50 includes a trigger module 51 and an external trigger sensor 53. The trigger module 51 has an external trigger reporting pin 511, an external trigger transmission pin 513, and an output end. The external trigger reporting pin 511 is electrically connected to and electrically controlled by the microprocessor 21. The external trigger sensor 53 is electrically connected to the trigger module 51 through the external trigger transmission pin 513. The output end of the trigger module 51 is electrically connected to the external drive pin 45 of the wake-up unit 40 in order to control the wake-up unit 40 electrically.

The technical features of the components of the wireless sensing system 100 disclosed in the first preferred embodiment of the present invention have been stated above. The following paragraphs explain how the system operates and the intended effects of the system.

First, the wireless sensing system 100 has a built-in power supply mechanism and can therefore obtain sufficient electricity while performing a large number of computations. More specifically, once the wireless transmission module 23 of the control unit 20 receives a sensing signal from the outside (e.g., a sensing signal sent out from a source of wireless sensing signals or a wireless transmitter) and transmits the sensing signal to the microprocessor 21, the microprocessor 21 matches the high-level signal portion of the sensing signal to a work instruction in the memory module 25 and transmits the work instruction to the wake-up unit 40 through the internal control pin 41 so that, within a predetermined sequence cycle, the low-power-consumption timer in the wake-up unit 40 generates a working clock matching the work instruction and transmits the working clock to the power supply unit 10 electrically through the enabling pin 43 in order for the power supply unit 10 to act according to the working clock and thereby make the DC-DC booster module generate the electricity required for computation by the control unit 20. The output end 11 of the power supply unit 10 will also transmit the electricity generated by the DC-DC booster module to, and thereby charge, the supercapacitor C of the parallel-connected backup power unit 30.

Second, the wireless sensing system 100 has a built-in forced shutdown mode. More specifically, after completing the computation procedures of various logic programs or their subprograms, the microprocessor 21 reads a forced shutdown instruction from the memory module 25 and transmits the forced shutdown instruction to the wake-up unit 40 through the internal control pin 41 so that, within another predetermined sequence cycle, the low-power-consumption timer in the wake-up unit 40 generates a forced shutdown clock matching the forced shutdown instruction and transmits the forced shutdown clock to the power supply unit 10 through the enabling pin 43 in order for the power supply unit 10 to act according to the forced shutdown clock and thereby stop the DC-DC booster module from generating electricity and supplying the electricity to the control unit 20 and the supercapacitor C of the backup power unit 30. The control unit 20 of the wireless sensing system is thus brought into a forced shutdown mode to lower power consumption by the entire system.

Third, the wireless sensing system 100 has a backup power mechanism capable of supplying a small amount of electricity so that even though in the forced shutdown mode, the wireless sensing system 100 can still operate on the small amount of electricity supplied by the backup power unit 30. More specifically, once the wireless sensing system 100 enters the forced shutdown mode, the backup power unit 30 transmits the electricity stored in the supercapacitor C to the wake-up unit 40 and the electrical detection unit 50 through the output end 31 thanks to the electronic circuit properties of the RC charging/discharging circuit, thereby allowing the wake-up unit 40 and the electrical detection unit 50 to maintain their respective basic electrically driven functions. It is worth mentioning that in this embodiment, the supercapacitor C of the backup power unit 30 is configured to supply a small amount of electricity that enables operations requiring only dozens to hundreds of nA. This amount of electricity, however, is not a technical feature of, or a limitation on, the present invention. In fact, the model or type of the supercapacitor C may be adjusted or chosen according to the desired states of the entire circuit.

Fourth, the wireless sensing system 100 has an internal wake-up mechanism so that while the wireless sensing system 100 is in the forced shutdown mode, the internal wake-up mechanism can reset the wireless sensing system 100 from the forced shutdown mode to the working mode. More specifically, within a first predetermined sequence cycle after the wireless sensing system 100 enters the forced shutdown mode, the low-power-consumption timer in the wake-up unit 40 generates an internal wake-up clock and transmits the internal wake-up clock to the power supply unit 10 through the enabling pin 43 in order for the power supply unit 10 to act according to the internal wake-up clock and thereby make the DC-DC booster module generate again the electricity required for computation by the control unit 20. The wake-up unit 40 will also generate an internal wake-up reporting signal and transmit the internal wake-up reporting signal to the microprocessor 21 of the control unit 20 electrically through the internal control pin 41 so that the microprocessor 21 can tell from the internal wake-up reporting signal that an internal wake-up process is completed. It is worth mentioning that the output end 11 of the power supply unit 10 will once again transmit the electricity generated by the DC-DC booster module to, and thereby charge, the supercapacitor C of the parallel-connected backup power unit 30 so that the electricity stored in the supercapacitor C can be used as backup power when the wireless sensing system 100 enters the forced shutdown mode again.

Figure 2:
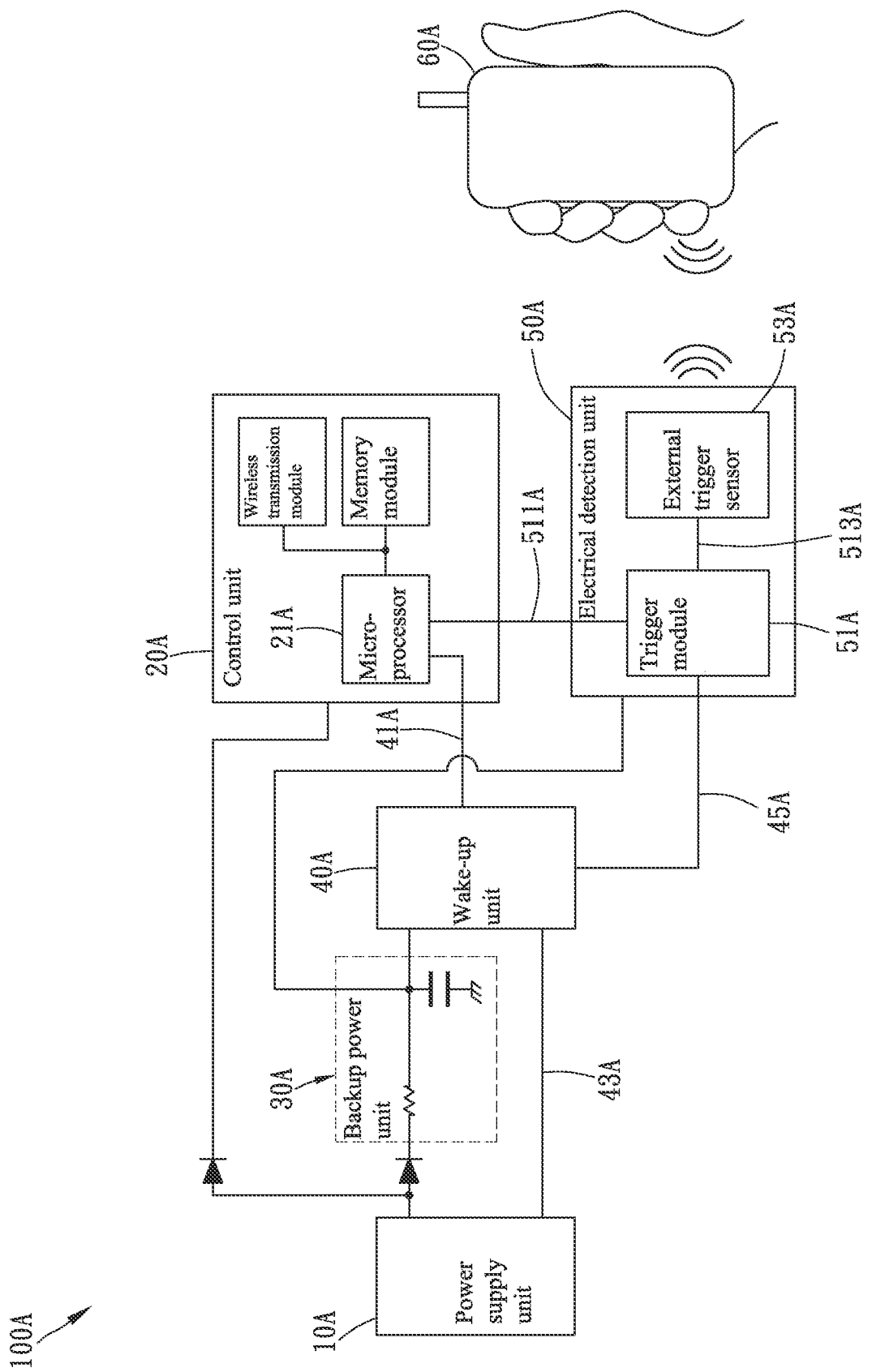
FIG. 2 is a structural diagram of the wireless sensing system according to the second preferred embodiment of the invention, with the system further including a source of wireless sensing signals.

Referring to FIG. 2 for the wireless sensing system 100A according to the second preferred embodiment of the present invention, the main structure of the wireless sensing system 100A is generally the same as that of the wireless sensing system 100 in the first preferred embodiment and includes a power supply unit 10A, a control unit 20A, a backup power unit 30A, a wake-up unit 40A, an electrical detection unit 50A, and a source 60A of wireless sensing signals. Identical components of the wireless sensing systems 100 and 100A have the same technical features and functions and therefore will not be described repeatedly. The second preferred embodiment of the invention is different from the first preferred embodiment in that the source 60A of wireless sensing signals is electrically connected to the external trigger sensor 53A of the electrical detection unit 50A of the wireless sensing system 100A in a wireless manner. It is worth mentioning that the trigger module 51A in the second preferred embodiment includes an XOR gate edge detection circuit, and that the external trigger sensor 53A is a proximity-sensing magnetic switch by way of example and may alternatively be composed of a pressure sensor, a temperature sensor, or a humidity sensor. The aforesaid structures of the trigger module 51A and of the external trigger sensor 53A, however, are not a technical feature of, or a limitation on, the invention.

The technical features of the components of the wireless sensing system 100A disclosed in the second preferred embodiment of the present invention have been stated above. The following paragraph explains how the system operates and the intended effects of the system.

The wireless sensing system 100A has an external trigger mechanism so that while in the forced shutdown mode, the wireless sensing system 100A can be reset from the forced shutdown mode to the working mode by the external trigger mechanism. More specifically, once the wireless sensing system 100A enters the forced shutdown mode, the external source 60A of wireless sensing signals can send out a sensing signal wirelessly and thereby transmit the sensing signal to the external trigger sensor 53A of the electrical detection unit 50A electrically in order for the magnetic switch in the external trigger sensor 53A to generate sensing data according to the sensing signal of the source 60A of wireless sensing signals, convert the sensing data into a digital sensing signal that can be determined as positive-logic or negative-logic (a "positive-logic" digital signal being a digital signal in which "1" represents the high level, and a "negative-logic" digital signal being a digital signal in which "0" represents the high level), and transmit the digital sensing signal to the trigger module 51A through the external trigger transmission pin 513A. The trigger module 51A will generate an external wake-up instruction according to the digital sensing signal and transmit the external wake-up instruction to the wake-up unit 40A through the external drive pin 45A so that, within a second predetermined sequence cycle, the low-power-consumption timer in the wake-up unit 40A generates an external wake-up clock matching the external wake-up instruction and transmits the external wake-up clock to the power supply unit 10A through the enabling pin 43A in order for the power supply unit 10A to act according to the external wake-up clock and thereby make the DC-DC booster module generate again the electricity required for computation by the control unit 20A. The trigger module 51A of the electrical detection unit 50A will also generate an external wake-up reporting signal and transmit the external wake-up reporting signal to the microprocessor 21A of the control unit 20A electrically through the external trigger reporting pin 511A so that the microprocessor 21A can tell from the external wake-up reporting signal that this wake-up process is externally triggered.

What is claimed is:

1. A wireless sensing system, comprising:
   a power supply unit, a control unit, a backup power unit, and a wake-up unit;
   the power supply unit being electrically connected to the control unit and the backup power unit;
   the control unit comprising a microprocessor, a wireless transmission module, and a memory module, the microprocessor being electrically connected to, and configured to electrically control, the wireless transmission module and the memory module;
   the backup power unit being electrically connected to the wake-up unit;
   the wake-up unit having an internal control pin and an enabling pin, the microprocessor of the control unit being electrically connected to the internal control pin of the wake-up unit, the wake-up unit being electrically controlled by the microprocessor through the internal control pin, the enabling pin of the wake-up unit being electrically connected to, and configured to electrically control, the power supply unit;

wherein the microprocessor of the control unit reads a forced shutdown instruction from the memory module and transmits the forced shutdown instruction to the wake-up unit through the internal control pin in order for the wake-up unit to generate a forced shutdown clock matching the forced shutdown instruction and transmit the forced shutdown clock to the power supply unit through the enabling pin, for the power supply unit to act according to the forced shutdown clock and thereby stop generating electricity, and for the backup power unit to transmit backup electricity to the wake-up unit;

wherein within a first predetermined sequence cycle, the wake-up unit generates an internal wake-up clock and transmits the internal wake-up clock to the power supply unit through the enabling pin in order for the power supply unit to generate electricity again according to the internal wake-up clock.

2. The wireless sensing system of claim 1, wherein when generating the internal wake-up clock and transmitting the internal wake-up clock to the power supply unit through the enabling pin within the first predetermined sequence cycle, the wake-up unit generates an internal wake-up reporting signal and transmits the internal wake-up reporting signal to the microprocessor of the control unit electrically through the internal control pin.

3. The wireless sensing system of claim 2, further comprising an electrical detection unit, the electrical detection unit comprising a trigger module and an external trigger sensor, the wake-up unit further having an external drive pin, wherein the trigger module of the electrical detection unit has an external trigger reporting pin and an external trigger transmission pin, the microprocessor of the control unit is electrically connected to the external trigger reporting pin of the trigger module, the external trigger sensor is electrically connected to the external trigger transmission pin of the trigger module, and the trigger module has an output end electrically connected to the external drive pin of the wake-up unit; wherein the trigger module acts according to an external wake-up instruction and transmits the external wake-up instruction to the wake-up unit through the external drive pin so that, within a second predetermined sequence cycle, the wake-up unit generates an external wake-up clock matching the external wake-up instruction and transmits the external wake-up clock to the power supply unit through the enabling pin in order for the power supply unit to generate electricity again according to the external wake-up clock.

4. The wireless sensing system of claim 3, further comprising a source of wireless sensing signals, wherein the source of wireless sensing signals sends out a sensing signal wirelessly and thereby transmits the sensing signal to the external trigger sensor of the electrical detection unit electrically in order for the external trigger sensor to generate sensing data according to the sensing signal, convert the sensing data to a digital sensing signal to be determined as positive-logic or negative-logic, and transmit the digital sensing signal to the trigger module through the external trigger transmission pin, and for the trigger module to generate the external wake-up instruction according to the digital sensing signal.

5. The wireless sensing system of claim 4, wherein when the wake-up unit generates the external wake-up clock matching the external wake-up instruction within the second predetermined sequence cycle, the trigger module of the electrical detection unit generates an external wake-up reporting signal and transmits the external wake-up reporting signal to the microprocessor of the control unit through the external trigger reporting pin.

6. The wireless sensing system of claim 1, further comprising an electrical detection unit, the electrical detection unit comprising a trigger module and an external trigger sensor, the wake-up unit further having an external drive pin, wherein the trigger module of the electrical detection unit has an external trigger reporting pin and an external trigger transmission pin, the microprocessor of the control unit is electrically connected to the external trigger reporting pin of the trigger module, the external trigger sensor is electrically connected to the external trigger transmission pin of the trigger module, and the trigger module has an output end electrically connected to the external drive pin of the wake-up unit; wherein the trigger module acts according to an external wake-up instruction and transmits the external wake-up instruction to the wake-up unit through the external drive pin so that, in a second predetermined sequence cycle, the wake-up unit generates an external wake-up clock matching the external wake-up instruction and transmits the external wake-up clock to the power supply unit through the enabling pin in order for the power supply unit to generate electricity again according to the external wake-up clock.

7. The wireless sensing system of claim 6, further comprising a source of wireless sensing signals, wherein the source of wireless sensing signals sends out a sensing signal wirelessly and thereby transmits the sensing signal to the external trigger sensor of the electrical detection unit electrically in order for the external trigger sensor to generate sensing data according to the sensing signal, convert the sensing data to a digital sensing signal to be determined as positive-logic or negative-logic, and transmit the digital sensing signal to the trigger module through the external trigger transmission pin, and for the trigger module to generate the external wake-up instruction according to the digital sensing signal.

8. The wireless sensing system of claim 7, wherein when the wake-up unit generates the external wake-up clock matching the external wake-up instruction within the second predetermined sequence cycle, the trigger module of the electrical detection unit generates an external wake-up reporting signal and transmits the external wake-up reporting signal to the microprocessor of the control unit through the external trigger reporting pin.

9. The wireless sensing system of claim 1, wherein the microprocessor has a dynamic multi-protocol manager (DMM) procedure for switching the wireless transmission module to a matching wireless transmission protocol.

10. The wireless sensing system of claim 2, wherein the microprocessor has a dynamic multi-protocol manager (DMM) procedure for switching the wireless transmission module to a matching wireless transmission protocol.

11. The wireless sensing system of claim 3, wherein the microprocessor has a dynamic multi-protocol manager (DMM) procedure for switching the wireless transmission module to a matching wireless transmission protocol.

12. The wireless sensing system of claim 4, wherein the microprocessor has a dynamic multi-protocol manager (DMM) procedure for switching the wireless transmission module to a matching wireless transmission protocol.

13. The wireless sensing system of claim 5, wherein the microprocessor has a dynamic multi-protocol manager (DMM) procedure for switching the wireless transmission module to a matching wireless transmission protocol.

14. The wireless sensing system of claim 6, wherein the microprocessor has a dynamic multi-protocol manager (DMM) procedure for switching the wireless transmission module to a matching wireless transmission protocol.

15. The wireless sensing system of claim 7, wherein the microprocessor has a dynamic multi-protocol manager (DMM) procedure for switching the wireless transmission module to a matching wireless transmission protocol.

16. The wireless sensing system of claim 8, wherein the microprocessor has a dynamic multi-protocol manager (DMM) procedure for switching the wireless transmission module to a matching wireless transmission protocol.

17. The wireless sensing system of claim 1, wherein the backup power unit comprises a pull-up resistor and a supercapacitor, the power supply unit has an output end electrically connected in parallel to positive electrodes of two diodes, one of the diodes has a negative electrode electrically connected to the control unit, the other diode has a negative electrode electrically connected to one end of the pull-up resistor of the backup power unit, the pull-up resistor has another end electrically connected to one end of the supercapacitor, and the supercapacitor has another end electrically connected to ground.

18. The wireless sensing system of claim 2, wherein the backup power unit comprises a pull-up resistor and a supercapacitor, the power supply unit has an output end electrically connected in parallel to positive electrodes of two diodes, one of the diodes has a negative electrode electrically connected to the control unit, the other diode has a negative electrode electrically connected to one end of the pull-up resistor of the backup power unit, the pull-up resistor has another end electrically connected to one end of the supercapacitor, and the supercapacitor has another end electrically connected to ground.

19. The wireless sensing system of claim 3, wherein the backup power unit comprises a pull-up resistor and a supercapacitor, the power supply unit has an output end electrically connected in parallel to positive electrodes of two diodes, one of the diodes has a negative electrode electrically connected to the control unit, the other diode has a negative electrode electrically connected to one end of the pull-up resistor of the backup power unit, the pull-up resistor has another end electrically connected to one end of the supercapacitor, and the supercapacitor has another end electrically connected to ground.

20. The wireless sensing system of claim 4, wherein the backup power unit comprises a pull-up resistor and a supercapacitor, the power supply unit has an output end electrically connected in parallel to positive electrodes of two diodes, one of the diodes has a negative electrode electrically connected to the control unit, the other diode has a negative electrode electrically connected to one end of the pull-up resistor of the backup power unit, the pull-up resistor has another end electrically connected to one end of the supercapacitor, and the supercapacitor has another end electrically connected to ground.

\* \* \* \* \*